United States Patent [19]

Rookasin

[11] 4,368,769
[45] Jan. 18, 1983

[54] TIRE CHAIN

[76] Inventor: Jerome L. Rookasin, 52 Ryegate Ter., Monroe, Conn. 06468

[21] Appl. No.: 212,961

[22] Filed: Dec. 4, 1980

[51] Int. Cl.³ .............................................. B60C 27/00
[52] U.S. Cl. ................................. 152/218; 24/68 TT; 24/116 R; 24/134 KB; 152/237; 254/252
[58] Field of Search ............... 152/217, 218, 232, 233, 152/237, 174, 181, 186, 220, 373, 221–230; 81/19.8; 254/252, 254, 257, 259; 24/134 R, 134 L, 134 KB, 68 TT, 68 CT, 68 A, 119 J, 122.3, 122.6, 116 R, 132 WL

[56] References Cited

U.S. PATENT DOCUMENTS

| | | | |
|---|---|---|---|
| 1,710,273 | 4/1929 | Sebring et al. | 24/134 KB |
| 2,540,230 | 2/1951 | Andrews | 152/218 |
| 2,729,261 | 1/1956 | Rucker | 152/218 |
| 3,264,700 | 8/1966 | Jouanno | 24/134 R |
| 3,765,061 | 10/1973 | Nash | 24/134 KB X |
| 3,893,499 | 7/1975 | Von Der Hellen | 152/217 X |
| 4,116,254 | 9/1978 | Seip | 152/237 X |

*Primary Examiner*—Edward C. Kimlin
*Assistant Examiner*—Thomas Bokan
*Attorney, Agent, or Firm*—Thomas L. Tully

[57] ABSTRACT

A skid-resisting chain adapted to be attached to and removed from the tires of a vehicle with a minimum of effort to provide improved traction in snow, ice, mud or other slippery road conditions. The attachment-detachment means comprises a flexible metal cable adapted to tie the tire chain around the tire and wheel and a biased cam gripping means adapted to frictionally-engage the end of the cable in a manner which provides increased locking action when a withdrawal force is applied to the cable and yet permits easy release when a tightening force or a detachment force is applied to the cable.

7 Claims, 8 Drawing Figures

TIRE CHAIN

BACKGROUND OF THE INVENTION

Tire chains have been known for many years as aids to motorists to provide improved traction for vehicle wheels in snow and ice conditions. Such chains are available as full tire chains, adapted to surround the entire tire tread, and as so-called strap chains, one or more of which are attached to the tire and wheel.

Strap chains are more popular with most motorists because they are less expensive than full chains and are easier to apply and remove. The latter consideration is most important for situations in which the motorist gets stuck in a snow bank or on a back road, or other situation, and must apply the chains himself under adverse conditions in order to free the vehicle. Thereafter, it is desirable to remove the chains once the vehicle reaches a non-slippery and high-speed roadway.

Conventional strap chains are provided with woven fabric straps adapted to tie the chains around the wheel hub and tire and with buckles or clamps which secure the end of the strap to the other end of the chain assembly to lock the tire chain in place. Such fabric straps have several disadvantages. They absorb water, freeze and become stiff and thick during use so that they are difficult to remove under freezing conditions. They have an upper surface and a lower surface and can be installed improperly, causing damage to the strap and/or loose attachment to the wheel and tire. The end of the woven strap becomes worn and frayed during repeated use so that it is difficult to pass through the wheel hub slot and into the buckle or clamp.

Also, the conventional buckles and clamps are difficult to use in association with the fabric straps for the reasons given above. Moreover, such clamps and buckles have narrow slots and exposed movable locking members which become caked with slush and ice during use and which are inoperative until they thaw.

Moreover, straps with conventional buckles and clamps are difficult to tighten when applied to the vehicle tire and, if tightened, are difficult to release.

SUMMARY OF THE INVENTION

The present invention provides novel strap chains for vehicles and is characterized by an improved tie element for attaching the chain assembly around the wheel hub and tire, and a cooperating locking means for releasably-attaching the free end of the tie means to the other end of the chain assembly to provide relatively simple attachment and detachment of the chain to the tire of a vehicle even under sub-freezing conditions.

The novel strap chains of the present invention comprise a flexible metal cable tie element which is substantially round in cross-section and which preferably is encased within a flexible plastic jacket, and a cooperating locking means comprising at least one pivotable cam element having a rough or toothed cable-engaging surface, said cam element(s) being biased in a direction corresponding to the direction of withdrawal of the cable from locked position to provide a locking nip between said cam elements or between one said cam element and a fixed post, said cam element(s) being freely pivotable in the direction of insertion of the cable to permit the cable to be pulled further into the nip to tighten the cable and chain, or to release the engagement of the rough or toothed surface of the cam element with the cable and permit the cable to be freely withdrawn from the nip for detachment of the tire chain from the wheel of the vehicle.

The present locking means is also provided with retainer means for urging and retaining the cable downwardly within the nip of the cam element(s), and preferably at least one pivotable cam element is provided with a pivot projection which facilitates the manual release of the cable from the locking nip.

BRIEF DESCRIPTION OF THE DRAWINGS

Referring to the drawings

DESCRIPTION OF THE INVENTION

Figure 1:
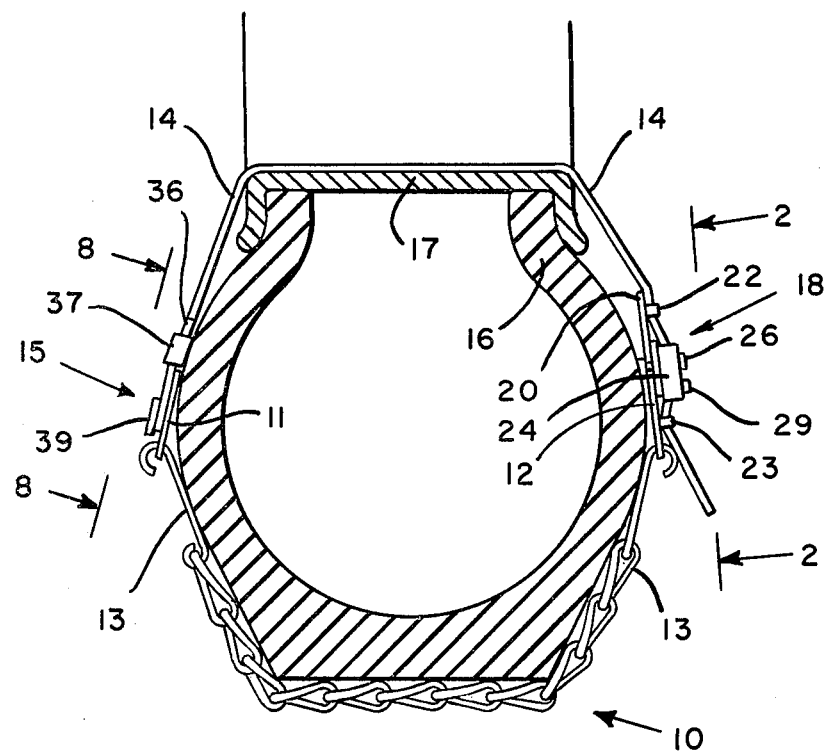
FIG. 1 is a cross-sectional view of a vehicle tire mounted on a wheel rim and having attached thereto a strap chain according to one embodiment of the present invention.

Referring to FIG. 1, the present strap chain 10 comprises first and second chain retainer plates 11 and 12, respectively, which are attached to the opposed ends of two lengths of conventional linked chain 13, a flexible metal cable 14, one end of which is attached to the first retainer plate 11, at connection 15, and the other end of which passed around the tire 16, through a conventional rim opening of the tire rim 17 and down into engagement in the locking nip between the cam elements 18 and 19 on the second retainer plate 12.

Figure 2:
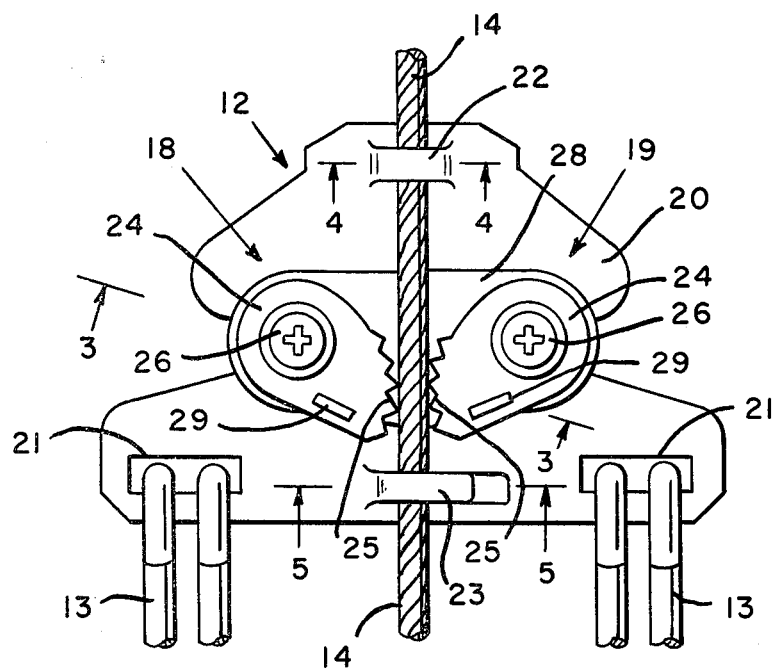
FIG. 2 is an enlarged view taken along the line 2—2 of FIG. 1.
Figure 4:
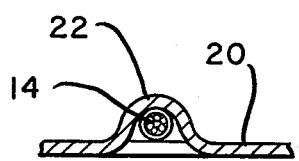
FIG. 4 is a view taken along the line 4—4 of FIG. 2.
Figure 5:
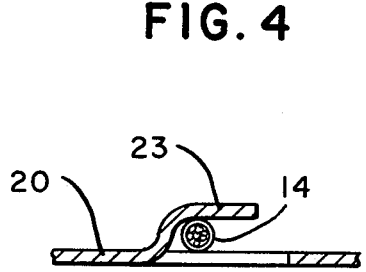
FIG. 5 is a view taken along the line 5—5 of FIG. 2.

Referring to FIG. 2, the retainer plate 12 thereof comprises a rigid metal backing plate 20 having opposed slots 21 to which the ends of the chains 13 are attached, a swaged raised bridge section 22 above said cam elements 18 and 19 providing an entry passage to receive and retain the cable 14 adjacent the surface of the plate 12, as shown more clearly by FIG. 4, and a cut and raised tab section 23 beneath which the end of the cable 14 can easily be slid to retain said end adjacent the surface of the plate 12, as shown more clearly by FIG. 5.

Figure 3:
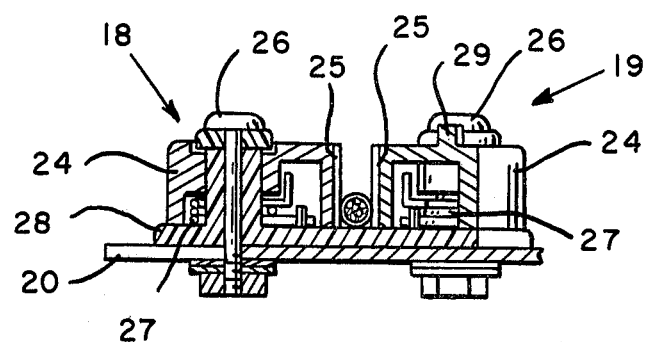
FIG. 3 is a view taken along the line 3—3 of FIG. 2.

The cam elements 18 and 19 comprise, as shown more clearly in FIG. 3, a cam housing 24 having a toothed cable-engaging face 25, an eccentric pivot pin 26, a coil spring 27 surrounding pin 26 and having one end attached to the supporting floor 28 and the other end attached to the cam housing 24, the spring 27 being under tension in order to bias or urge the toothed faces 25 of the cam elements 18 and 19 towards each other and against a cable 14 positioned in the nip of said faces 25. Thus, the left cam element 18 is biased or spring-urged in a counterclockwise direction, while the right cam element 19 is biased or spring-urged in a clockwise direction to grip the cable 14 in the nip between the toothed faces 25 thereof. Any upward force on cable 14 or downward force on the chains 13, as would be exerted by centrifugal force during high speed rotation of the wheels of the vehicle, causes tighter engagement between the cable 14 and the cam faces 25.

However, any downward force on the end of the cable 14, such as holding the member 12 fixed with one hand while pulling down on the end of the cable 14 with the other hand causes the cam faces 25 to loosen their grip on the cable and permit the cable to be pulled tighter or to be removed from the nip, if desired. For the latter purpose, the cam elements 18 and 19 are provided with pivot projections 29 which facilitate the manual retraction of the cam elements 18 and 19 for lifting and removal of the cable from the nip. Generally, the end of the cable 14 is first slipped out from under the tab retainer 23 and lifted so that the portion of the cable between the cam faces 25 can be freed by pulling the cable and lifting it simultaneously. Thereafter, the freed end of the cable is withdrawn through the bridge passage 22 and pulled back through the tire rim for removal of the tire chain.

Since the flexible cable is metallic, and particularly if encased within a plastic jacket, the cable cannot absorb water and freeze, as is the case with woven fabric straps. Thus the cable does not stiffen or swell, nor does the end become frayed. Also, the cable is round in cross-section so that it can be inserted in the rim slot without fear of it being twisted, as is a problem with flat fabric straps. Also, the cable is selfsupporting or semi-rigid and can be guided into the rim slot, during application, whereas a fabric strap is limp and must be fed directly into the rim slot from close range. A preferred cable is a plastic-sheathed steel cable consisting of a multiplicity of twisted steel strands conventionally used for aircraft and marine cable purposes.

Also, since the cam elements 18 and 19 contain internal or weather-shielded springs, said elements are resistant to freezing or locking under the effects of accumulated slush or ice. Also, the floor element 28 is a plastic sheet which provides a slippery, water-resistant surface over which the cam elements pivot with ease.

Figure 6:
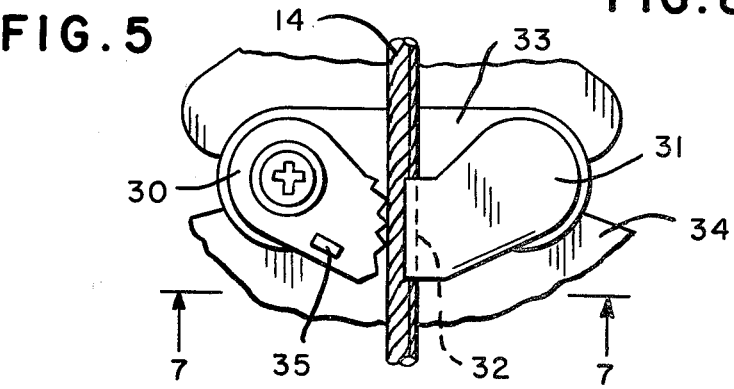
FIG. 6 is a view corresponding to that of FIG. 2 but illustrating the use of a single pivotable cam element and a fixed locking post according to another embodiment of the present invention.
Figure 7:
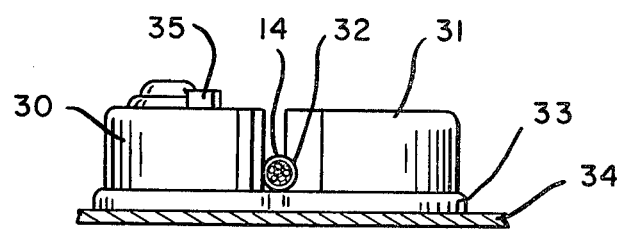
FIG. 7 is a view taken along the line 7—7 of FIG. 6.

As discussed supra, the present invention also contemplates the use of a single pivotable cam element in association with a fixed backing element or post. FIGS. 6 and 7 illustrate a suitable embodiment comprising a single cam element 30, identical to cam element 18 of FIGS. 2 and 3, and a fixed backing post 31 having a recess 32 adjacent the floor element 33 adapted to receive and retain the cable 14 adjacent said floor element within the nip of said recess and the toothed face of the cam element 30, the chain retaining plate being shown at 34. Clockwise rotation of the cam element 30, such as by pulling down on the pivot projection 35, releases the cable 14 and opens the gap sufficiently to permit the cable to be lifted from the nip.

The fixed backing post preferably has a rough or toothed cable-engaging surface, whether said post is recessed, as shown in FIGS. 6 and 7, or not. The fixed post may be similar in external appearance to the cam element 19 of FIG. 2 but fixed to the floor element or retaining plate.

Figure 8:
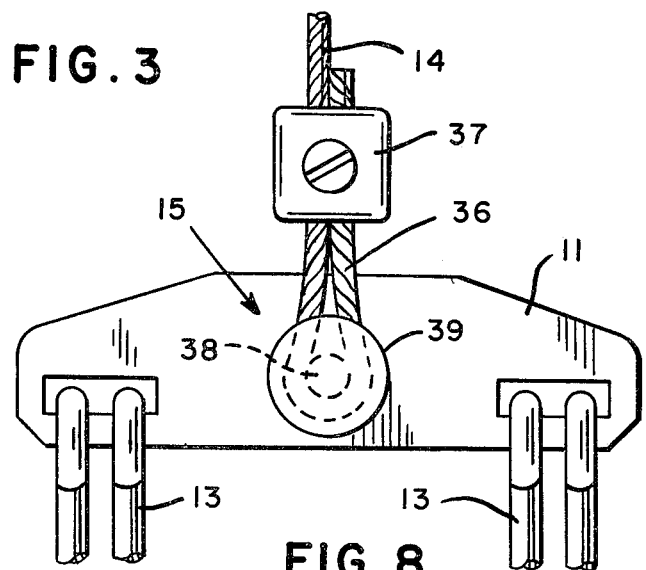
FIG. 8 is a view taken along the line 8—8 of FIG. 1.

The means 15 used to attach the cable to the first chain retaining plate 11 is not critical. FIG. 8 illustrates a suitable arrangement which permits pivotal movement of the cable 14 relative to the plate 11. Thus, the lead end of the cable 14 is bent to form a small loop 36 and a clamp 37 is applied. The loop 36 is placed around a pin 38 projecting from the plate 11 and a top flange 39 is applied to or swaged on said pin 38 to retain the loop 36 on the pin 38 while permitting the cable loop to rotate around the pin for ease of application and adjustment of the strap chain on the wheel.

Any other means may be used to attach the cable to the plate 11 such as by forming a loop, such as 36 of FIG. 8, and passing said loop through a hole in plate 11.

It should be understood that the tire chains of the present invention may be made in a variety of sizes to fit automobile tires of all sizes, large bus and truck tires or small tires such as on motorcycles used for racing on slippery surfaces such as dirt, mud, ice, etc. Also, the number of parallel chain lengths 13 may be varied depending upon the size of the strap chains, wider chain-retaining plates 11 and 12 being used to accommodate 3, 4 or more chain lengths, as desired.

An essential feature of the present invention resides in the use of retainer means for urging the cable down into the nip between the cam elements or cam element and backing post. Either or both of the retainer means 22 or 23 may be used. Alternatively, a lower recess such as 32 of FIGS. 6 and 7 may be used in the fixed post 31, as shown, and/or in the pivotable cam elements 18, 19 or 30. In the absence of such retainer means, the cable can become dislodged from between the cam elements as a result of vibration during use, causing the strap chain to become detached from the wheel of the vehicle.

Variations and modifications of the present invention will be apparent to those skilled in the art within the scope of the present claims.

I claim:

1. A strap chain adapted to be fastened through the rim and around the tire of a vehicle to improve the traction thereof, comprising at least one length of chain, opposed retainer plates attached to each end of said length of chain, a length of flexible metallic cable of round cross-section having one end attached to one of said plates and of sufficient length to enable the other free end thereof to pass through the slot in the rim of a vehicle wheel and be engaged by cable-engaging means present on the other of said plates, said cable-engaging means comprising at least one cam element which is pivotally-attached to said other plate and is biased for movement against another element in the direction of withdrawal of said cable to provide a pressure nip into which said cable can be easily inserted and tightened because of reverse rotation of said cam element but from which said cable cannot be withdrawn because of the confinement of said cable in the nip between said cam element and said other element, said cam element having a toothed surface which is adapted to engage and lock said cable in said nip, and being manually reverse-rotatable to unlock said cable from said nip, and retainer means adapted to overlie and hold said cable, adjacent its said other end, down against said other plate within said nip to prevent movement of said cable away from said plate and dislodgement from said nip as a result of vibration during use.

2. A strap chain according to claim 1 in which said other element is a second cam element which is pivotably attached to said plate and is biased for movement towards said one cam element.

3. A strap chain according to claim 1 in which said retainer means comprises at least one projection on said plate which is adapted to receive and retain said cable adjacent said plate.

4. A strap chain according to claim 1 in which said other element comprises a fixed post and said retainer means comprises a lower recess in said post, adjacent said other plate.

5. A strap chain according to claim 1 or 2 in which each said cam element is provided with an external projection which facilitates reverse-rotational manual pivoting of said cam element.

6. A strap chain according to claim 1 in which said cable comprises a multiplicity of twisted steel wires.

7. A strap chain according to claims 1 or 6 in which said cable comprises a flexible plastic sheath.

* * * * *